(12) United States Patent
Rhoads

(10) Patent No.: US 7,224,995 B2
(45) Date of Patent: May 29, 2007

(54) DATA ENTRY METHOD AND SYSTEM

(75) Inventor: Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 956 days.

(21) Appl. No.: 09/758,532

(22) Filed: Jan. 10, 2001

(65) Prior Publication Data

US 2001/0023193 A1    Sep. 20, 2001

Related U.S. Application Data

(63) Continuation-in-part of application No. 09/543,125, filed on Apr. 5, 2000.

(60) Provisional application No. 60/163,332, filed on Nov. 3, 1999.

(51) Int. Cl.
*H04M 1/00*    (2006.01)

(52) U.S. Cl. .............. 455/550.1; 455/556.1; 382/100

(58) Field of Classification Search ............ 455/522.1, 455/550.1, 554.2, 556.1, 556.2, 557, 566, 455/575.1, 151.2, 552.1; 480/247, 270; 382/232, 382/236, 100
See application file for complete search history.

(56) References Cited

U.S. PATENT DOCUMENTS

| | | |
|---|---|---|
| 5,385,371 A | 1/1995 | Izawa |
| 5,450,490 A | 9/1995 | Jensen et al. |
| 5,491,507 A * | 2/1996 | Umezawa et al. ....... 348/14.02 |
| 5,499,294 A | 3/1996 | Friedman |
| 5,584,070 A | 12/1996 | Harris |
| 5,665,951 A | 9/1997 | Newman et al. |
| 5,673,316 A | 9/1997 | Auerbach et al. |
| 5,742,845 A | 4/1998 | Wagner |
| 5,761,686 A | 6/1998 | Bloomberg |
| 5,764,770 A | 6/1998 | Schipper |
| 5,778,102 A | 7/1998 | Sandford, II et al. |
| 5,857,038 A | 1/1999 | Owada et al. |
| 5,892,900 A | 4/1999 | Ginter et al. |
| 5,893,037 A * | 4/1999 | Reele et al. ............. 455/556.1 |

(Continued)

FOREIGN PATENT DOCUMENTS

EP    1152592    11/2001

(Continued)

OTHER PUBLICATIONS

Rekimoto, "Titling Operations for Small Screen Interfaces (Tech Note)," ACM Symp. on User Interface Software and Technology, 1996.

(Continued)

*Primary Examiner*—Simon Nguyen

(57) ABSTRACT

According to one aspect of the present invention, a wireless telephony device is equipped with an optical image sensor, and a lens for imaging an object onto the sensor. The optical sensor permits a variety of useful functionality, including decoding of bar codes, watermarks, etc., from objects imaged by the sensor. One application of such a device is to interact with a remote computer system using data decoded from a bar code or watermark. For example, the device can be used to scan image data from an item depicted in a catalog, and then to transmit an order for the item from the catalog's on-line web store—using digital data decoded from the image to identify the desired item.

12 Claims, 1 Drawing Sheet

U.S. PATENT DOCUMENTS

| | | | |
|---|---|---|---|
| 5,893,937 A | 4/1999 | Reele et al. | |
| 5,900,608 A | 5/1999 | Iida | |
| 5,915,027 A | 6/1999 | Cox et al. | |
| 5,937,000 A | 8/1999 | Lee | |
| 6,002,946 A | 12/1999 | Reber | |
| 6,036,086 A | 3/2000 | Sizer, II et al. | |
| 6,052,486 A | 4/2000 | Knowlton et al. | |
| 6,072,494 A | 6/2000 | Nguyen | |
| 6,088,585 A * | 7/2000 | Schmitt et al. | 455/411 |
| 6,094,586 A * | 7/2000 | Nishiyama et al. | 455/566 |
| 6,115,482 A | 9/2000 | Sears et al. | |
| 6,121,530 A | 9/2000 | Sonoda | |
| 6,122,403 A | 9/2000 | Rhoads | |
| 6,122,526 A * | 9/2000 | Parulski et al. | 455/556.1 |
| 6,144,848 A * | 11/2000 | Walsh et al. | 455/419 |
| 6,164,534 A | 12/2000 | Rathus et al. | |
| 6,192,257 B1 * | 2/2001 | Ray | 455/566 |
| 6,195,104 B1 | 2/2001 | Lyons | |
| 6,243,596 B1 | 6/2001 | Kikinis | |
| 6,249,226 B1 | 6/2001 | Harrison et al. | |
| 6,252,598 B1 | 6/2001 | Segen | |
| 6,278,781 B1 * | 8/2001 | Rhoads | 380/247 |
| 6,282,362 B1 | 8/2001 | Murphy | |
| 6,282,363 B1 | 8/2001 | Murphy | |
| 6,308,084 B1 * | 10/2001 | Lonka | 455/556.1 |
| 6,311,214 B1 | 10/2001 | Rhoads | |
| 6,317,609 B1 * | 11/2001 | Alperovich et al. | 455/556.1 |
| 6,389,055 B1 | 5/2002 | August | |
| 6,408,331 B1 | 6/2002 | Rhoads | |
| 6,424,843 B1 * | 7/2002 | Reitmaa et al. | 455/566 |
| 6,427,078 B1 * | 7/2002 | Wilska et al. | 455/550.1 |
| 6,430,554 B1 | 8/2002 | Rothschild | |
| 6,448,979 B1 | 9/2002 | Schena et al. | |
| 6,505,160 B1 | 1/2003 | Levy et al. | |
| 6,510,325 B1 | 1/2003 | Mack, II et al. | |
| 6,512,835 B1 | 1/2003 | Numao | |
| 6,525,768 B2 | 2/2003 | Obradovich | |
| 6,573,883 B1 | 6/2003 | Bartlett | |
| 6,628,326 B1 * | 9/2003 | Manico et al. | 348/211.12 |
| 6,636,249 B1 | 10/2003 | Rekimoto | |
| 6,636,748 B2 | 10/2003 | Monroe | |
| 6,647,267 B1 | 11/2003 | Britt et al. | |
| 6,650,761 B1 | 11/2003 | Rodriguez et al. | |
| 6,651,053 B1 | 11/2003 | Rothschild | |
| 6,674,993 B1 | 1/2004 | Tarbouriech | |
| 6,675,165 B1 | 1/2004 | Rothschild | |
| 6,687,345 B1 | 2/2004 | Swartz | |
| 6,700,990 B1 * | 3/2004 | Rhoads | 382/100 |
| 6,941,275 B1 | 9/2005 | Swierczek | |
| 6,947,571 B1 * | 9/2005 | Rhoads et al. | 382/100 |
| 2001/0001854 A1 | 5/2001 | Schena et al. | |
| 2001/0011233 A1 | 8/2001 | Narayanaswami | |
| 2001/0017885 A1 | 8/2001 | Asai et al. | |
| 2001/0033674 A1 | 10/2001 | Chen et al. | |
| 2001/0044824 A1 | 11/2001 | Hunter et al. | |
| 2001/0047428 A1 | 11/2001 | Hunter | |
| 2001/0051996 A1 | 12/2001 | Cooper et al. | |
| 2002/0018579 A1 | 2/2002 | Rhoads et al. | |
| 2002/0023148 A1 | 2/2002 | Ritz et al. | |
| 2002/0028000 A1 | 3/2002 | Conwell et al. | |
| 2002/0034297 A1 | 3/2002 | Rhoads | |
| 2002/0049569 A1 | 4/2002 | Lenoir et al. | |
| 2002/0064297 A1 | 5/2002 | Brunk et al. | |
| 2002/0075298 A1 | 6/2002 | Schena et al. | |
| 2002/0102966 A1 | 8/2002 | Lev et al. | |
| 2002/0122568 A1 | 9/2002 | Zhao | |
| 2003/0011684 A1 | 1/2003 | Narayanaswami et al. | |
| 2003/0012403 A1 | 1/2003 | Rhoads et al. | |
| 2003/0141375 A1 | 7/2003 | Lawandy | |
| 2005/0043018 A1 | 2/2005 | Kawamoto | |
| 2005/0058319 A1 * | 3/2005 | Rhoads et al. | 382/100 |

FOREIGN PATENT DOCUMENTS

| | | |
|---|---|---|
| WO | WO 98/48548 | * 10/1998 |
| WO | WO00/36605 | 6/2000 |

OTHER PUBLICATIONS

Fitzmaurice, "Situated Information Spaces and Spatially Aware Palmtop Computers," Comm. of the ACM, vol. 36, No. 7, pp. 39-49, Jul. 1993.

Rekimoto, "The World through the Computer: Computer Augmented Interaction with Real World Environments," ACM Symp. on User Interface Software and Technology, 1995.

Small et al, "Design of Spatially Aware Graspable Displays," Extended Abstracts of CHI '97, 2 pp.

* cited by examiner

DATA ENTRY METHOD AND SYSTEM

RELATED APPLICATION DATA

This application is a continuation-in-part of application Ser. No. 09/571,422, filed May 15, 2000 (now Pat. No. 6,947,571), which claims priority to provisional application 60/163,332, filed Nov. 3, 1999.

FIELD OF THE INVENTION

The present invention relates to optical sensing of digital data, and use of such technology in a variety of contexts (e.g., cell phones) and for a variety of purposes (e.g., merchandise ordering).

BACKGROUND AND SUMMARY OF THE INVENTION

In copending applications Ser. No. 09/343,104 (filed Jun. 29, 1999), and Ser. No. 09/292,569 (filed Apr. 15, 1999; now abandoned in favor of continuing application Ser. No. 10/379,393), the present assignee details a variety of technologies that employ optical data sensing to invoke various communication or control functions. The present specification builds on those earlier applications, detailing additional novel technologies and systems.

For example, according to one aspect of the present invention, a wireless telephony device is equipped with an optical image sensor, and a lens for imaging an object onto the sensor. The optical sensor permits a variety of useful finctionality, including decoding of bar codes, watermarks, etc., from objects imaged by the sensor.

One application of such a device is to interact with a remote computer system using data decoded from a bar code or watermark. For example, the device can be used to scan image data from an item depicted in a catalog, and then to transmit an order for the item from the catalog's on-line web store—using the associated digital data decoded from the image to identify the item desired.

The foregoing and additional features and advantages of the present technology will be more readily apparent from the following detailed description.

DETAILED DESCRIPTION

Figure 1:
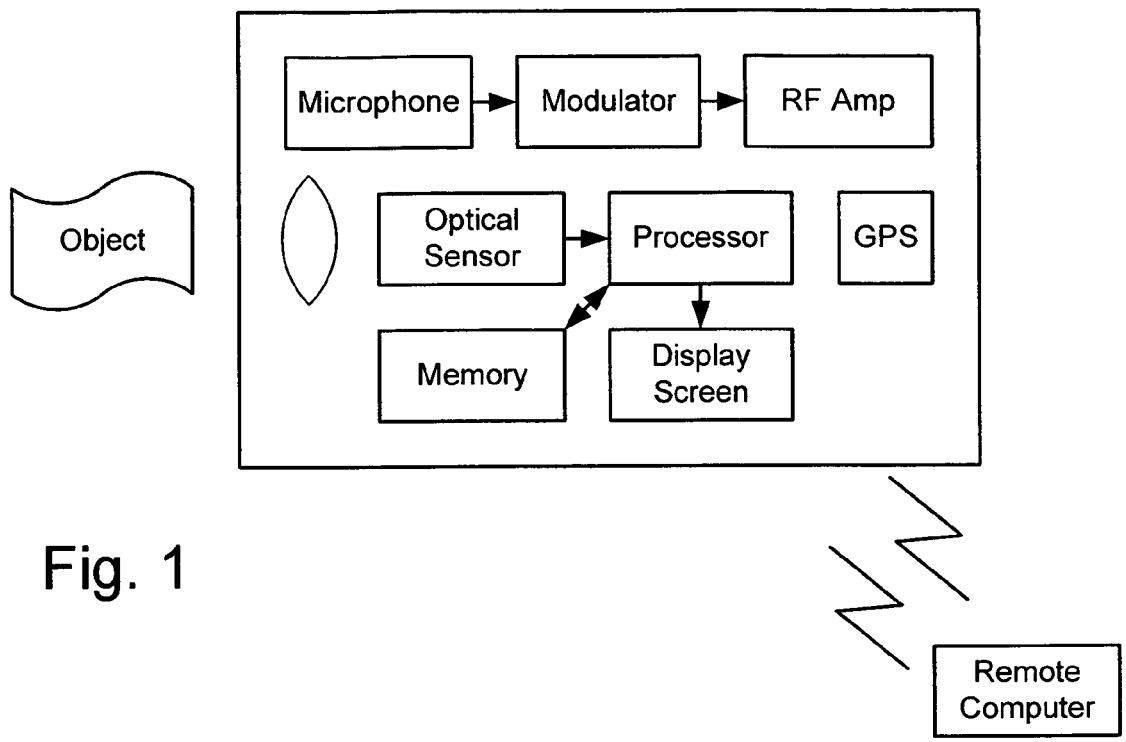
FIG. 1 is a block diagram of a system according to one embodiment of the present invention.

The cited '104 application details a variety of optical input devices, including some in which the optical sensor element and "Bedoop" (now known as Digimarc MediaBridge) decoding circuitry are integrated on a common substrate. A variety of other novel input devices can also be used.

One is a mouse-like peripheral that includes an optical sensing system. The optical sensing system can comprise a ID array of plural optical sensors (e.g., CCD, CMOS, etc.), or a 2D array. Such devices are already known in other contexts, e.g., the Microsoft IntelliMouse with IntelliEye technology. That device includes a multi-element CMOS optical sensor integrated on an IC with various detector and processing circuitry, operating in conjunction with a short focal length imaging lens and an LED illumination source. The circuitry tracks movement of patterns across the sensor's field of view, by which the mouse's movement can be deduced. The Microsoft product collects 1500 data sets per second—a rate much higher than is needed in most embodiments of the assignee's Bedoop technology.

Such a mouse-like peripheral can omit the buttons and position-sensing features commonly provided on traditional mice, yielding a simple desk-facing palm camera that generates frames of data corresponding to a small area under the sensor portion of the mouse. More typically, however, the peripheral includes the buttons, roller wheels, and/or X-/Y-position sensing arrangements of traditional mice so that button and positional forms of data input can be exploited in interacting with the Bedoop application.

The optical data collected by the sensor can be processed within the peripheral's processor to extract the steganographically encoded binary Bedoop data therefrom. Or this processing burden can be undertaken by the associated computer system, with the peripheral simply processing and formatting the raw sensor data into sequential frames of image data to be output to that system.

Any form of hand-held scanner—whether of the type just described or others known in the art—offers a convenient way to interact with catalog advertising. Imagine a traditional paper catalog, e.g., from L.L. Bean, Inc., or Lands End. Each image in the catalog is Bedoop-encoded with a code that identifies the depicted product. A user browsing through the catalog, on seeing a product of interest, places the scanner over the picture (and optionally may be required to push a button or otherwise signal to initiate further processing). The scanner detects the Bedoop data and relays it to an associated computer (optionally with data identifying the consumer). The computer polls a remote server computer maintained by the merchant, which responds with data corresponding to the item depicted in the scanned image. This returned data can include data indicating the sizes available, data indicating the colors available, data indicating the variant styles available, flag bits indicating whether each item is in stock, etc. This returned data can be presented to the consumer—typically on a display device but alternatively in audible form.

Preferably, the customer's body measurements (waist size, inseam length, neck size, etc.) are stored in a user profile, either on the local computer or at the merchant's server computer. This allows the system to customize the data presented to the user—e.g., showing the color options and availability only for the depicted shirt in a 16 inch neck and a 34 inch sleeve length.

If necessary, the user can select among the color or style options, using the handheld input device (either buttons, gestures, etc.), or any other input device. Or the item may be one for which no further specifications are needed. In either event, once the desired product has been sufficiently specified, the user can signal the system to place the order. Payment and shipping details can be arranged through any of the great variety of techniques known in the art, e.g., by charging to a credit card number and shipping to an address on-file with the merchant (as detailed, e.g., in U.S. Pat. No. 5,960,411).

While scanning peripherals of the type described above are typically wired to an associated host system, wireless links (e.g., radio, infrared, ultrasonic, etc.) can of course be used, freeing the user from the constraint imposed by the cable.

One of the embodiments detailed in the earlier applications is a pay telephone with a Bedoop sensor. The technology can likewise be integrated into cellular phones, of the type available from Motorola, Nokia, Qualcomm, and others, and reviewed in applicant's allowed application Ser. No. 09/172,324 (now U.S. Pat. No. 6,064,737). Such a phone can be equipped with a 1D or 2D image sensor, the output of which is applied to Bedoop decoding circuitry within the phone. This decoding circuitry can be the phones's main CPU, or can be a processing circuit dedicated to Bedoop functionality. (As noted elsewhere, the decoding can be effected by dedicated hardware, by decoding software executing on a general purpose CPU, etc.)

Cell phones are already equipped with numerous features that make them well suited for Bedoop operation. One is that cell phones typically include an LCD or similar screen for display of textual or graphic information, and additionally include buttons or other controls for selecting among menu options presented on the screen (e.g., by moving a cursor. Moreover, cell phones naturally include both audio input and output devices (i.e., microphone and speaker). Still further, the protocol by which cell phones transmit data includes data identifying the phone, so that such data need not be separately encoded. And finally, cell phones obviously provide ready links to remote computer systems. Collectively, these capabilities rival those of the most fully-equipped desktop computer system. Thus, essentially all of the applications detailed in the prior applications can be implemented using cell phone Bedoop systems.

As with the other Bedoop systems, when Bedoop data is sensed, the phone can respond to the data locally, or it can forward same over the cellular network to a remote system (or computer network) for handling.

One application that may be invoked locally (i.e., within the phone) is the dialing of a corresponding telephone number (as detailed, e.g., in the above-cited applications). In some embodiments, the phone number is literally encoded as part of the Bedoop data payload. In others, the phone number is stored in a memory within the phone, and indexed in accordance with an identifier decoded from the Bedoop data.

The variety of operations that can be handled remotely is virtually limitless. Some entail interaction with the user. For example, the remote system may initially respond by presenting to the user a menu of options on the display screen (e.g., Purchase, Add to Shopping List, Request Sample, Add to Notepad, etc.) The user then responds by providing further input (e.g., by manipulating one or more buttons on the phone, by providing spoken instructions to a voice recognition sub-system within the phone, etc.). This further data is then dispatched from the phone, and the requested action undertaken. Other operations don't require further interaction with the user, but immediately invoke a corresponding action.

In this and other contexts, it will be recognized that the gestural input concepts detailed in the prior applications involve relative movement between the sensor and the encoded object. In most of the earlier examples, the sensor is stationary, so gesticulation is effected by moving the object. Naturally, if the sensor is moveable (e.g., as a cell phone), the gestural movement can be effected by moving the sensor instead.

In the earlier-filed applications, the user can solicit different responses by moving the object relative to the sensor. In other embodiments, different responses can be solicited without movement, e.g., by presenting the object at different orientations.

Consider a magazine advertisement. When presented to the sensor with the top of the page up, a first response can be invoked. If the page is presented at a rotation of 90 degrees, a second response can be invoked. Similarly with 180 degrees rotation (i.e., upside down), and 270 degrees rotation. The Bedoop detector can detect these different rotational states by reference to attributes of the watermark signal discerned from the magazine page (e.g., by reference to the rotation state discerned from the subliminal grid signal detailed in applicant's prior patents).

While the just-described arrangement included the Bedoop decoding function within the phone, in other embodiments the image data can be transmitted from the phone and decoded at a remote location.

In the earlier-filed applications, reference was made to GPS receivers as permitting the location of a person to be tracked, and contact information updated accordingly. GPS receivers find many other applications in Bedoop contexts. For example, the response of a Bedoop system can be tailored, or vary, in accordance with the location of the person invoking the operation. To illustrate, if a user presents a newspaper insert or coupon for a Dominos pepperoni pizza meal to the Bedoop sensor on a GPS-equipped cellular phone, the GPS data can be encoded in the Bedoop data dispatched to the Domino's Bedoop server. That server can identify, by reference to the GPS data, the location of the nearest Domino's franchise, and can forward the order to that franchisee. The franchisee, in turn, can telephone the user (by reference to telephone number data from the cell phone) to confirm the order, inquire if additional items are desired, inform the user of the final price, and to obtain the delivery address. (The latter step can be omitted; the franchisee can employ the GPS data to obtain the corresponding street address, e.g., from map data licensed through NavTech of Chicago.)

The protocols by which the Bedoop data, GPS data, and cell phone identification data are conveyed from the phone to the cellular network can take various forms; the design of such systems are familiar to those in the relevant arts. In one embodiment, the protocols by which some cell phones are now provided with email or internet access are further adapted to convey Bedoop and GPS data. The protocols for conveying telephone identification data are already well established. Once received by the cellular network, the Bedoop data can be formatted into packets, either incorporating the GPS data and telephone data into the same packet structure, or by formatting such data into separate packets accompanying the Bedoop packets.

The provision of image sensors in cell phones enables other functionality. One is the capture of still or video imagery. Such image data can be compressed (typically by lossy processes such as MPEG, JPEG, or the like, implemented with dedicated hardware CODEC's) and transmitted with the audio data. The screens on such phones can likewise be used for display of incoming image or video data.

Another function enabled by image sensors in cell phones is user-verification, e.g., by retinal scanning or other optically-sensed biometrics, before the phone will permit a call to be placed. A great number of such biometric verification techniques are known.

Cell phone Bedoop sensors may not always be in communication with the cell phone network. The phone may be out of range of a cell site, or may be in operational mode in which an RF link is not then established. In such events, any Bedoop data sensed by the phone that is to be handled remotely is desirably stored locally within the phone, and queued for transmission to the cellular network the next time communication is established (a so-called "store and forward" form of operation).

Figure 2:
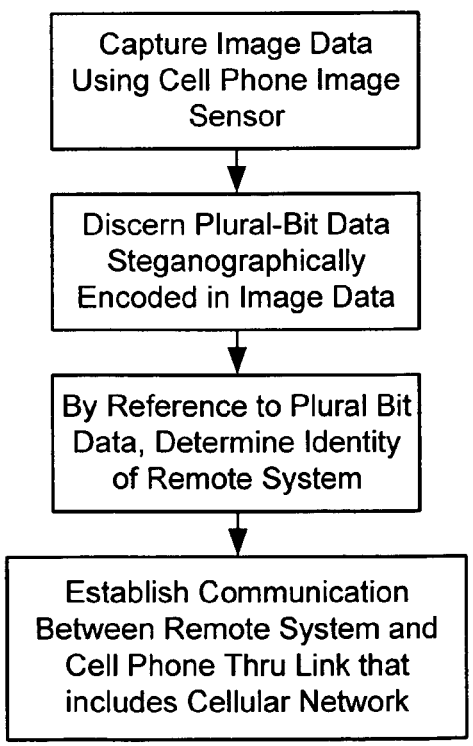
FIG. 2 is a flow chart of a method according to one embodiment of the present invention.

Certain of the foregoing arrangements are depicted in FIGS. 1 and 2.

Tatoos

Wholly unrelated to the foregoing is the notion of a Bedoop-encoded tattoo. Temporary tattoos are well known and typically include an ink or printed film that is transferred to a wearer's skin through some application process (e.g., wetting or otherwise). The artwork on the tattoo can be arranged to steganographically encode Bedoop data.

E-Paper

While the prior applications noted that a great variety of printing technologies can be employed in Bedoop applications, it should be noted that e-paper can be employed as well. E-paper, developed by Nicholas K. Sheridon of Xerox, and mass produced by 3M, is a thin layer of transparent plastic in which millions of small beads, somewhat like toner particles, are dispersed. The beads, each contained in a fluid-filled cavity, are free to rotate within those cavities. The beads are "bichromal," with hemispheres of contrasting color (e.g. black and white). Under the influence of a voltage applied to the surface of the sheet, the beads rotate to present one colored side or the other to the viewer. A pattern of voltages can be applied to the surface in a bit-wise fashion to create images such as text and pictures. The image persists until new voltage patterns are applied to create new images. The reader is presumed familiar with the U.S. patents issued to Sheridon on this technology.

It will further be recognized that epaper can be used to convey digital data according to essentially any known watermarking method, including those detailed in the patents and applications incorporated by reference, and is also suitable for conveying digital information in data glyph form.

Revenue Sharing

When a consumer presents a Bedoop-encoded object to a sensor, and as a result of the link(s) thereby established, purchases a product or service, the revenue from that transaction may be shared with the participants who made it possible. In the case of a Bedoop-encoded magazine ad, some of the participants may include (1) the photographer or graphic designer who produced artwork used in the ad; (2) the advertising agency whose creative talent led to the ad; (3) the publisher of the magazine in which the consumer encountered the ad; (4) the service provider(s) who provided the transport channel(s) between the consumer and the vendor; and (5) the service provider who maintained the server that ultimately linked the Bedoop data to the vendor's web site.

Building Access

Another use of the Bedoop technology detailed in the '104 application (and other applications and patents of the present assignee) is to control building access (or facility access, or room access, etc.) access through a combination of an ID card, Bedoop technology, and proximity detection technology.

The ID card can be a badge or the like having a steganographically-encoded photograph of the bearer. The card further includes a proximity ID device, such as an unpowered electronic circuit that is excited and detected by a radiant field from an associated proximity detector, providing a unique signature identifying a particular individual.

The building can be provided with an image sensor, such as a video camera or the like, an associated Bedoop detection system, and the proximity detector. When a user wearing the badge approaches, the proximity detector signals the camera to capture image data. The Bedoop detection system identifies the badge photograph as conveying Bedoop data (e.g., by clues as are described in the prior applications, or without such aids), and decodes same. The access control system then checks whether the badge ID discerned from the proximity sensor properly corresponds to the Bedoop data extracted from the photograph on the badge. If so, access is granted; if not, the data is logged and an alarm is sounded.

By such arrangement, premises security is increased. No longer can proximity-based access badges be altered to substitute the picture of a different individual. If the photo is swapped, the proximity system ID and the embedded photo data will not match, flagging an unauthorized attempted access.

The same principles are applicable in many other contexts—not limited to RF-based proximity detection systems. For example, the data decoded from the photograph can be compared against other forms of machine-sensed personal identification. These include, but are not limited to, bar code IDs, mag-stripe ID cards, smart cards, etc.

As known from the prior applications, there are a great number of techniques by which the encoding of Bedoop digital data can be performed. The present assignee's prior application Ser. No. 09/127,502 (filed Jul. 31, 1998, now U.S. Pat. No. 6,345,104), for example, shows techniques by which very fine lines can be printed on a medium to slightly change the medium's apparent tint, while also conveying digital data. Commonly-owned application Ser. No. 09/074,034, filed May 6, 1998 (now U.S. Pat. No. 6,449,377), details how the contours of printed imagery can be adjusted to convey digital data. (That technique can be applied to printed text characters, as well as the line art imagery particularly considered.) The assignee's U.S. Pat. No. 5,850,481 details how the surface of paper or other media can be textured to convey optically-detectable binary data. The assignee's U.S. Pat. No. 5,841,886, 5,809,160 and 5,862,260 detail various techniques for steganographically encoding photographs and other imagery.

Some watermarking techniques are based on changes made in the spatial domain; others are based on changes made in transformed domains (e.g., DCT, wavelet). One example of the latter is shown in U.S. Pat. No. 5,930,369. Watermarking of printed text can be achieved by slight variations to character shape, character kerning, line spacing, etc.

Data glyph technology, as detailed in various patents to Xerox, is usable in many of the applications detailed herein. Bar codes, too, may also be used.

The foregoing is just a gross under-sampling of the large number of watermarking techniques. The artisan is presumed to be familiar with such art, all of which is generally suitable for use in the applications detailed herein.

To provide a comprehensive disclosure without unduly lengthening this specification, applicant incorporates by reference the patents and applications cited above.

Having described an illustrated the principles of my inventions with reference to specific embodiments, it will be recognized that the principles thereof can be implemented in many other, different, forms. Moreover, the particular combinations of elements and features in the above-detailed embodiments are exemplary only; the interchanging and substitution of these teachings with teachings in the incorporated-by-reference applications are also contemplated.

I claim:

1. In a wireless telephony device including a microphone, a modulator, and an RF amplifier, the device serving to receive and transmit RF signals conveying audio data, an improvement comprising:
 a display screen;
 an optical sensor having plural sensing elements and producing image data;
 a lens for imaging an object onto the sensor; and
 a processor for discerning plural-bit data steganographically encoded within said image data and for directing an action based on said plural bit data;
 wherein said action based on said plural-bit data comprises presenting information obtained from a remote computer on said display screen.

2. The device of claim 1 in which said information is a web page.

3. In a wireless telephony device including a microphone, a modulator, and an RF amplifier, the device serving to receive and transmit RF signals conveying audio data, an improvement comprising:
 a display screen;
 an optical sensor having plural sensing elements and producing image data;
 a lens for imaging an object onto the sensor; and
 a processor for discerning plural-bit data steganographically encoded within said image data and for directing an action based on said plural bit data;
 wherein said action is establishing a telephonic link to a phone number determined by reference to said plural-bit data.

4. In a wireless telephony device including a microphone, a modulator, and an RF amplifier, the device serving to receive and transmit RF signals conveying audio data, an improvement comprising:
 a display screen;
 an optical sensor having plural sensing elements and producing image data;
 a lens for imaging an object onto the sensor; and
 a processor for discerning plural-bit data steganographically encoded within said image data and for directing an action based on said plural bit data;
 the device further including a GPS system for determining location of the device, and said action is a first action if the GPS system determines the device is in a first location, and said action is a second, different action if the GPS system determines the device is in a second, different location.

5. The device of claim 4 in which said first action is linking from said device to a first remote system, and said second action is linking from said device to a second remote system.

6. The device of claim 4 in which said first action is loading first graphic data from a remote system for presentation on said display screen, and said second action is loading second graphic data from a remote system for presentation on said display screen.

7. In a wireless telephony device including a microphone, a modulator, and an RF amplifier, the device serving to receive and transmit RF signals conveying audio data, an improvement comprising:
 a display screen;
 an optical sensor having plural sensing elements and producing image data;
 a lens for imaging an object onto the sensor; and
 a processor for discerning plural-bit data steganographically encoded within said image data and for directing the device to transmit at least some of said plural-bit data to a remote system for further action.

8. The device of claim 7, further including a memory in which said plural-bit data is cached for later transmission to the remote system.

9. A method of operating a cell phone, including:
 capturing image data using a 2D image sensor included with said cell phone;
 discerning plural-bit data steganographically encoded in said image data;
 at least in part by reference to said plural-bit data, determining an identity of a remote system; and
 establishing communication between said remote system and the cell phone thru a link that includes a cellular network.

10. The method of claim 9 wherein the remote system is another cell phone.

11. The method of claim 9 wherein the remote system is a computer, and the communication includes transferring graphic data from said computer for display on the cell phone.

12. The method of claim 9 that further includes sensing a location of the cell phone, and determining the identity of said remote system at least in part by reference to said location.

* * * * *

UNITED STATES PATENT AND TRADEMARK OFFICE
CERTIFICATE OF CORRECTION

| | |
|---|---|
| PATENT NO. | : 7,224,995 B2 |
| APPLICATION NO. | : 09/758532 |
| DATED | : May 29, 2007 |
| INVENTOR(S) | : Geoffrey B. Rhoads |

It is certified that error appears in the above-identified patent and that said Letters Patent is hereby corrected as shown below:

On the title page, item 63, delete lines 1-2 and insert the following:

-- Continuation-in-part of application 09/571,422, filed May 15, 2000 (now patent 6,947,571). --

Signed and Sealed this
Fourth Day of October, 2011

David J. Kappos
*Director of the United States Patent and Trademark Office*